(12) United States Patent
Takenaga et al.

(10) Patent No.: US 7,994,936 B2
(45) Date of Patent: *Aug. 9, 2011

(54) TRAFFIC ENVIRONMENT RECOGNITION METHOD AND SYSTEM FOR CARRYING OUT THE SAME

(75) Inventors: Hiroshi Takenaga, Takai-mura (JP); Shoji Muramatsu, Tokyo (JP); Yuji Otsuka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1109 days.

This patent is subject to a terminal disclaimer.

(21) Appl. No.: 11/752,494

(22) Filed: May 23, 2007

(65) Prior Publication Data

US 2010/0265101 A1    Oct. 21, 2010

Related U.S. Application Data

(63) Continuation of application No. 10/224,605, filed on Aug. 21, 2002, now Pat. No. 7,224,290.

(30) Foreign Application Priority Data

Nov. 29, 2001    (JP) .................................. 2001-366276

(51) Int. Cl.
*G08G 1/095* (2006.01)

(52) U.S. Cl. ...................................................... 340/907

(58) Field of Classification Search .................. 340/907, 340/901, 903, 904, 933, 937, 939, 988, 539.1; 701/301, 117
See application file for complete search history.

(56) References Cited

U.S. PATENT DOCUMENTS

| | | | |
|---|---|---|---|
| 5,230,400 A * | 7/1993 | Kakinami et al. | 180/169 |
| 5,341,344 A * | 8/1994 | O'Brien et al. | 367/96 |
| 5,357,438 A * | 10/1994 | Davidian | 701/301 |
| 6,553,130 B1 * | 4/2003 | Lemelson et al. | 382/104 |
| 6,577,937 B1 * | 6/2003 | Shuman et al. | 701/48 |

* cited by examiner

*Primary Examiner* — Phung Nguyen
(74) *Attorney, Agent, or Firm* — Crowell & Moring LLP

(57) ABSTRACT

A traffic environment recognition system includes units for image-processing and information-merging, a radar unit. A network is connected to the image-processing unit. The radar, information-merging, and a vehicle control unit control the traveling operation of the vehicle. The image-processing unit recognizes headway distance, the azimuth, relative speed and width of a preceding vehicle, and the lane position of the host vehicle. The radar unit recognizes headway distance, the azimuth and relative speed of the preceding vehicle. The information-merging unit receives recognition results provided by the image-processing unit. The radar unit through the network, merges and identifies those results. When the recognition results provided by the image-processing unit and the radar unit relate to the same vehicle, output information is produced by the information-merging unit to identify the vehicles as one and the same vehicle and sends the output information through the network to the vehicle control unit.

10 Claims, 10 Drawing Sheets

0 0 : IMAGE-PROCESSING UNIT 0 1 : RADAR UNIT 1 0 : ROAD INFORMATION ACQUISITION UNIT 1 1 : RESERVATION

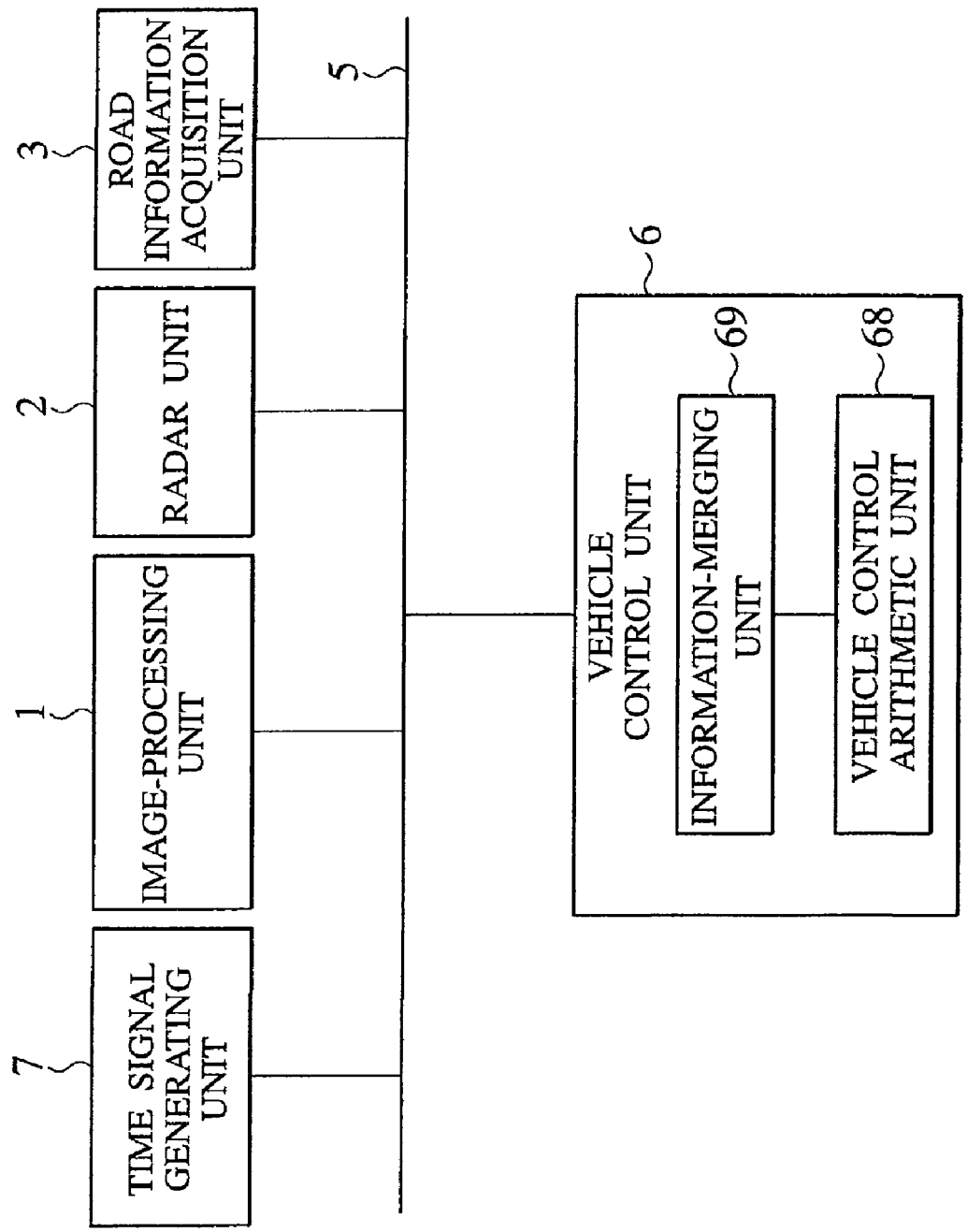

TRAFFIC ENVIRONMENT RECOGNITION METHOD AND SYSTEM FOR CARRYING OUT THE SAME

RELATED APPLICATIONS

This application is a continuation of U.S. application Ser. No. 10/224,605, filed Aug. 21, 2002, and issued as U.S. Pat. No. 7,224,290, on May 29, 2007, which claims priority to Japanese patent application no. JP 2001-366276, filed Nov. 29, 2001, the disclosure of which is expressly incorporated by reference herein in its entirety.

BACKGROUND OF THE INVENTION

The present invention relates to a traffic environment recognition method and a system for carrying out the same and, more particularly to a traffic environment recognition method suitable for recognizing the traffic environment of a vehicle, and a traffic environment recognition system for carrying out the traffic environment recognition method to be loaded on a vehicle, such as an automobile.

Importance of active safety measures for recognizing the environment of a vehicle including lanes and other vehicles, detecting a condition that may cause an accident, and warning the driver of the vehicle to take measures for avoiding dangers or avoiding accidents by positively automatically controlling the vehicle has progressively increased. Various automotive traffic environment recognition systems have been proposed.

An active cruise control system (ACC system) has been commercially marketed. This ACC system measures the headway distance between the host vehicle and the preceding vehicle by using a laser radar or a millimeter wave radar, and accelerates or decelerates the host vehicle according to the measured headway distance to maintain safety vehicle spacing. Thus, the ACC system ensures the safe operation of the vehicle.

However, the laser radar or the millimeter wave radar (hereinafter referred to simply as "radar") employed in the ACC system must operate on limited power to measure the headway distance between the host vehicle and the preceding vehicle traveling a long distance ahead. Therefore, the radar of the ACC system cannot use a vertically and horizontally wide beam. Consequently, it occurs sometimes that the beam of the radar passes through a space under the preceding vehicle when the preceding vehicle is a heavy truck and the ACC system fails in detecting the preceding heavy truck or that the host vehicle nose-dives and the ACC system fails in detecting the preceding vehicle when the host vehicle decelerates sharply to avoid collision against the sharply decelerated preceding vehicle or a cut-in vehicle.

Since the ACC system is provided with only a single radar and, sometimes, fails in detecting the preceding vehicle in case the host vehicle nose-dives. Thus, it is essential to the enhancement of the safety of the vehicle to measure the headway distance between the host vehicle and the preceding vehicle on the basis of detection signals provided by a plurality of sensors, and to improve the reliability of the ACC system.

Traffic environment recognition systems provided with a plurality of sensors are disclosed in, for example, Japanese Patent Laid-open Nos. 6-230115 (first reference), 11-44533 (second reference) and 2000-121730 (third reference). The traffic environment recognition system mentioned in the first reference determines a headway distance on the basis of an image formed by a camera, and a measurement provided by a millimeter wave radar, and uses the headway distance with higher reliability. For example, it is decided that the reliability of information provided by the camera is low in a rainy or foggy weather, and it is decided that the reliability of information provided by the millimeter wave radar is low when information about the road on which the host vehicle is traveling read from a road map of an automotive navigation system indicates a curve of a small radius or a narrow road. A headway distance determined on the basis of the information provided by the camera is used when it is decided that the reliability of the information provided by the camera is high or a headway distance determined on the basis of the information provided by the millimeter wave radar is used when it is decided that the reliability of the information provided by the millimeter wave radar is high.

The traffic environment recognition system mentioned in the second reference measures the headway distance between the host vehicle and the preceding vehicle by a radar, calculates the headway distance by a headway distance measuring unit on the basis of the measured headway distance, and controls the traveling speed of the host vehicle automatically by a vehicle speed control unit on the basis of the calculated headway distance. Meanwhile, an image input unit provides an image of a scenery extending ahead of the host vehicle, a measuring unit sets a template including a point corresponding to a position of distance measurement in the input image provided by the image input device, and a template image storage unit stores a template image included in the template in a storage device. When the radar is unable to measure distance, a control unit executes a control operation to make a correlation calculating unit determine an image area most analogous with the template image stored in the storage device by a correlation process, calculates an estimated position of the preceding vehicle at the center of the image area, and a headway distance calculating unit calculates a headway distance on the basis of the estimated position of the preceding vehicle.

The traffic environment recognition system mentioned in the third reference measures the headway distance between the host vehicle and the preceding vehicle by a millimeter wave radar, measures the width of the preceding vehicle by a laser radar in a state where both the millimeter wave radar and the laser radar are detecting the preceding vehicle, and uses a headway distance measured by the millimeter wave radar and a vehicle width previously measured by the laser radar in other states.

In a system disclosed in Japanese Patent Laid-open No. 2001-84485, a traffic sign or the like is set on a road extending ahead of a visible camera for detection data provided by a visible image sensor and a millimeter wave laser, a visible image-processing unit decides a self-detection ability according to the variation of environmental condition from an image of the traffic sign and provides the results of processing, a detection information selecting and processing unit selects automatically an output provided by a detectable vehicle detecting device, and the following operation is performed on the basis of selected detection information to detect abnormal traveling and stoppage.

Those prior art techniques have the following problems because the same uses information detected and provided by another sensor when the reliability of the single sensor is low.

(1) A decision must be made as to whether or not the same object is recognized.

(2) The decision needs a complicated procedure when there are a plurality of preceding vehicles or objects.

(3) The extensibility of the system is unsatisfactory in using other sensors including a navigation system in addition to the radar and the image-processing unit.

The prior art vehicle controller controls a vehicle for traveling on the basis of detection information provided by the plurality of sensors. However, the vehicle controller must decide whether or not the plurality of sensors detected the same object, which needs a complicated vehicle control algorithm, control performance is affected adversely, and the improvement of control function and reliability is difficult.

SUMMARY OF THE INVENTION

Accordingly, it is an object of the present invention to provide a traffic environment recognition method capable of providing highly reliable traffic environment recognition information, a traffic environment recognition system for carrying out the traffic environment recognition method, and a vehicle provided with the traffic environment recognition system.

According to one aspect of the present invention, a traffic environment recognition method includes the steps of: recognizing information about a plurality of recognition objects representing an environment of a vehicle; examining recognition results; merging the recognition results on the basis of results of examination of the recognition results to obtain merged information; and providing output information produced by adding identification information identifying at least one of the plurality of recognition objects to the merged information.

The traffic environment recognition method may provide output information produced by adding identification information identifying the plurality of recognition objects to the merged information.

According to another aspect of the present invention, a traffic environment recognition system includes; a plurality of traffic environment recognizing means for recognizing the environment of a vehicle; and an information merging means for merging recognition results provided by the plurality of traffic environment recognizing means to provide merged information; wherein the information merging means provides output information produced by adding identification information identifying a recognition object to the recognition results provided by at least two of the plurality of traffic environment recognizing means.

The information merging means of the traffic environment recognition system may have the following function:

(1) A function of providing output information produced by adding information identifying a plurality of recognition objects to information obtained by merging recognition results provided by at least two of the plurality of traffic environment recognizing means;

(2) A function of providing output information produced by adding the result of decision as to whether or not the merged recognition results provided by at leas two of the plurality of traffic environment recognizing means include those relating one and the same recognition object as information identifying recognition objects to the merged recognition results; or (3) A function of providing information produced by adding the result of decision as to whether or not the merged recognition results provided at least two of the plurality of traffic environment recognizing means include those relating to the same recognition objects among a plurality of recognition objects as information identifying the plurality of recognition objects to the merged recognition results.

The traffic environment recognition system may further include the following elements:

(1) The plurality of traffic environment recognizing means use different mediums, respectively, for the recognition of the environment of the vehicle;

(2) The plurality of traffic environment recognizing means use similar mediums for the recognition of the environment of the vehicle;

(3) The plurality of traffic environment recognizing means provides recognition results respectively provided with message identification numbers proper to the traffic environment recognizing means, and the information merging means discriminates the recognition results and the message identification numbers provided by the traffic environment recognizing means and provides output information produced by adding a message identification number corresponding to the result of discrimination to merged recognition results obtained by merging the recognition results provided by the traffic environment recognizing means;

(4) The plurality of traffic environment recognizing means provides the recognition results with time information common to the traffic environment recognizing means, and the information merging means identifies the recognition objects on the basis of the recognition results provided by the traffic environment recognizing means and the time information, and provides output information produced by adding the result of discrimination to the recognition results provided by the traffic environment recognizing means;

(5) The information merging means adds the result of identification of the recognition objects in connection with the traffic environment recognizing means to information produced by merging the recognition results provided by the plurality of traffic environment recognizing means;

(6) The information merging means has a function to demand the output of the recognition results from the traffic environment recognizing means;

(7) The plurality of traffic environment recognizing means include information merging means, respectively; and (8) The plurality of traffic environment recognizing means are connected through a network to the information merging means.

According to a third aspect of the present invention, a vehicle is provided with the foregoing traffic environment recognition system, and a vehicle control unit capable of controlling the traveling operation of the vehicle on the basis of the output information provided by the information merging means included in the traffic environment recognition system.

According to the foregoing means, the recognition results provided by at least the two traffic environment recognizing means are merged to provide merged information, the information identifying the recognition objects is added to the merged information, and the merged information with the information identifying the recognition objects is provided. Thus, highly reliable traffic environment recognition information can be provided. The recognition objects may be other vehicles, moving directions of the other vehicles, the relative speeds of other vehicles with respect to the host vehicle, and the widths of the other vehicles.

The traffic environment recognizing means may be, for example, image-processing devices capable of forming images of the environment of the host vehicle and processing the images, or radars, such as millimeter wave radars or laser radars, capable of emitting an electric wave or a light beam to measure distances between the host vehicle and objects in the environment of the host vehicle.

Load on the vehicle control unit can be reduced and the programming of a vehicle control algorithm can be facilitated by giving merged information produced by merging the recognition results provided by the plurality of traffic environment recognizing means and provided with the information identifying the recognition objects.

BRIEF DESCRIPTION OF THE DRAWINGS

Other objects and advantages of the invention will become apparent from the following description of embodiments with reference to the accompanying drawings in which:

FIG. 12 is a block diagram of a traffic environment recognition system in a fourth embodiment according to the present invention.

DESCRIPTION OF THE PREFERRED EMBODIMENTS

Figure 1:
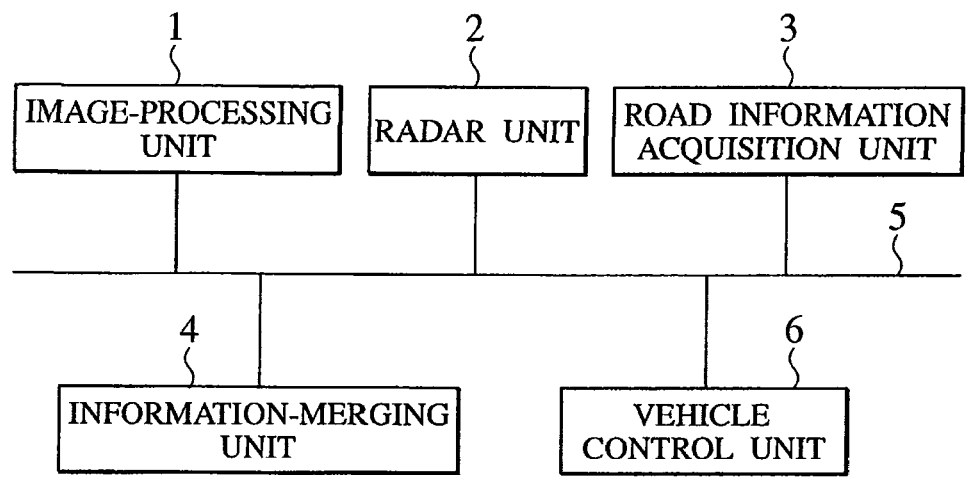
FIG. 1 is a block diagram of a traffic environment recognition system in a first embodiment according to the present invention.

Referring to FIG. 1, a traffic environment recognition system in a first embodiment according to the present invention has an image-processing unit 1, a radar unit 2, a road information acquisition unit 3, an information-merging unit 4 and a network 5 interconnecting those component units. The network 5 is connected to a vehicle control unit 6.

The image-processing unit 1 includes a CCD camera (charge-coupled device camera) provided with a CCD, i.e., a traffic environment recognizing sensor, and an image processor. The image-processing unit 1 forms an image of the environment of a host vehicle, and processes the image to recognize information about distances between the host vehicle and other vehicles, the moving directions of other vehicles, the relative speeds of other vehicles with respect to the host vehicle and the widths of other vehicles, road shape (straight or curved), lane type (cruising lane or passing lane) and lane departure. The image-processing unit 1 provides the results of recognition for recognition objects sequentially onto the network 5. The image-processing unit 1 determines the distances between the host vehicle and other vehicles from the coordinates of images of other vehicles in the image formed by the CCD camera, recognizes the road shape through the enhancement of the boundaries between the road and while lines, and recognizes lane departure with respect to the coordinates of the center of the CCD camera.

The radar unit 2 has a laser radar or a millimeter wave radar, i.e., a traffic environment sensor. The radar unit 2 emits an electric wave or a light beam to measure distances between the host vehicle and objects in the environment, directions from the host vehicle toward the objects and the relative speeds of the objects, and provides measured data on the objects sequentially on the network 5.

Figure 2:
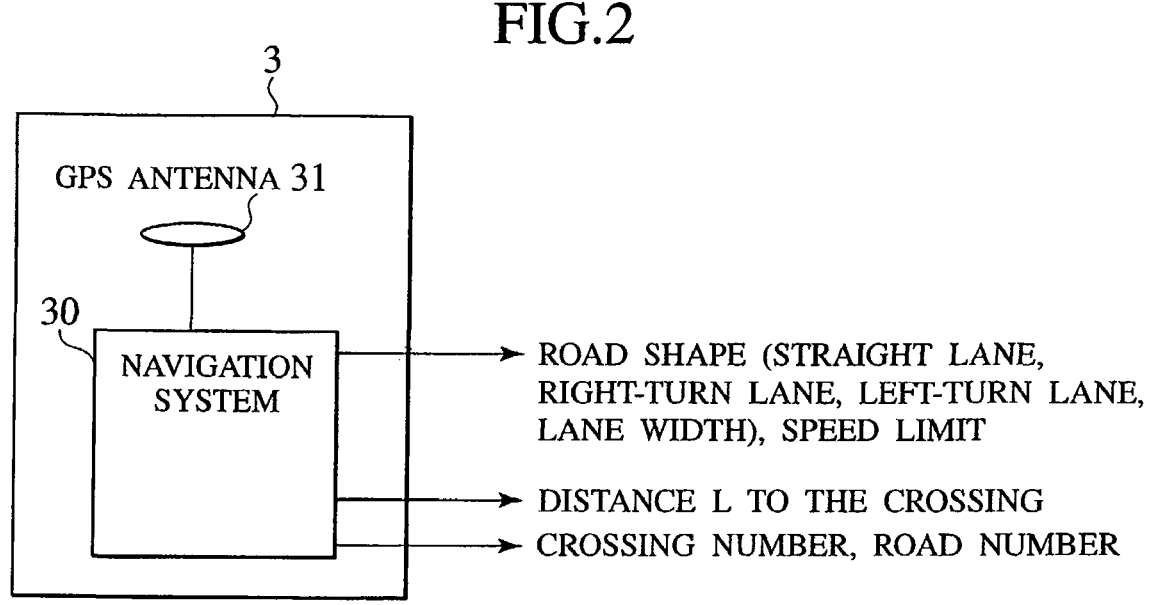
FIG. 2 is a block diagram of a road information acquisition unit.

The road information acquisition unit 3 has a navigation system 30, i.e., a traffic environment sensor, provided with a GPS antenna (global positioning system antenna) 31 as shown in FIG. 2. The road information acquisition unit 3 receives information about latitude and longitude through the GPS antenna 31 from an artificial satellite, determines the position of the host vehicle from the received information, compares the thus determined position of the host vehicle with a road map stored in the navigation system 30 to find a road on which the host vehicle is traveling and a crossing toward which the host vehicle is traveling. The road information acquisition unit 3 reads road shape information (straight lane, right-turn lane, left-turn lane, road width) and information about regulation speeds from the road map, calculates a distance L to the nearest crossing, and provides recognized information including the calculated results and the shape information on the network 5. The road information acquisition unit 3 stores specific numbers assigned to roads and crossings shown in the road map, i.e., road numbers and crossing numbers, and provides the road number and the crossing number on the network 5. If the navigation system 30 has a route calculating function, the road information acquisition unit 3 calculates an optimum route from a source to a destination, and gives information about the calculated optimum route.

The information-merging unit 4 is provided with a data processor. The information-merging unit 4 receives measured pieces of information provided by the image-processing unit 1, the radar unit 2 and the road information acquisition unit 3 through the network 5, i.e., the CAN (controller area network, a standard automotive network), merges the pieces of information, examines the recognized results, adds identification information identifying the recognized object, i.e., information indicating that the recognized results including a vehicle interval, a azimuth and a relative speed are for the same vehicle, to the merged information, and provides the merged information together with the identification information on the network 5.

Figure 3:
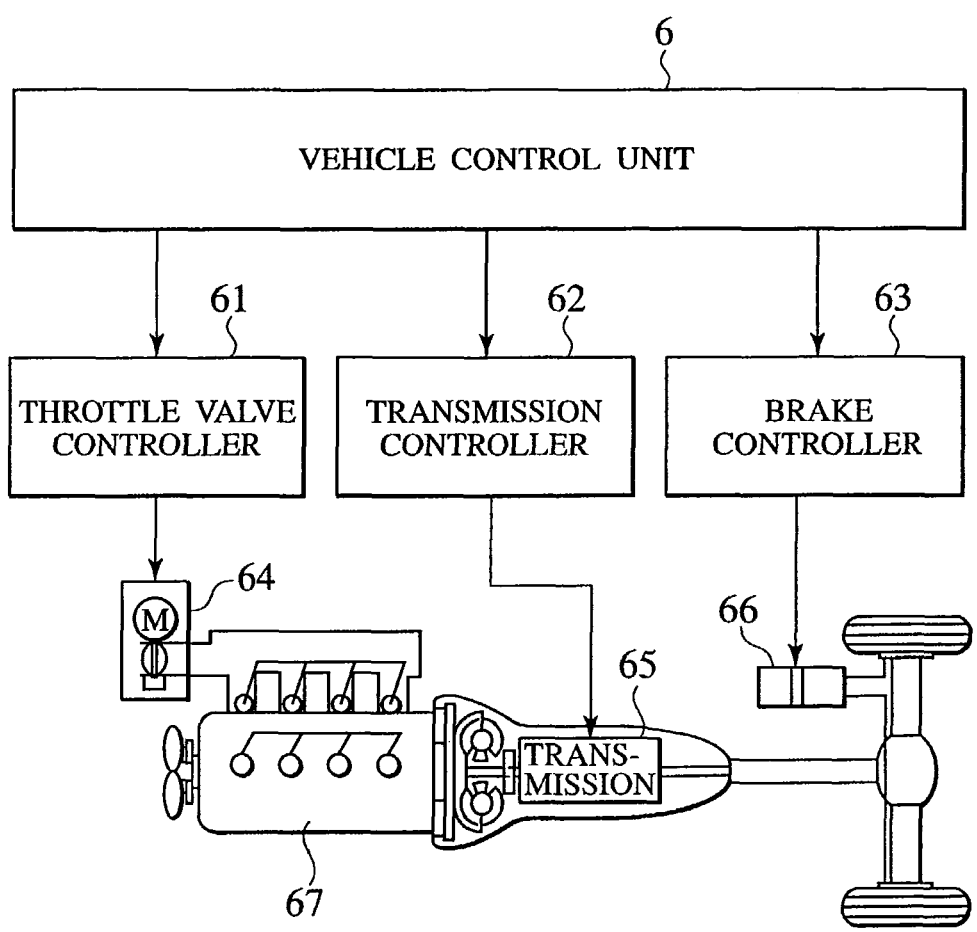
FIG. 3 is a block diagram of a host vehicle provided with a vehicle control unit.

The vehicle control unit 6 (vehicle control means) controls the traveling operation of the host vehicle on the basis of the information provided by the information-merging unit 4. As shown in FIG. 3, a throttle valve controller 61, a transmission controller 62 and a brake controller 63 are connected to the vehicle control unit 6. The throttle valve controller 61 is connected to a throttle valve actuator 64 included in an engine 67, the transmission controller 62 is connected to a transmission 65, and the brake controller 63 is connected to a brake actuator 66. The throttle valve controller 61 controls the operation of the throttle valve actuator 64 according to a throttle valve control signal provided by the vehicle control unit 6 to regulate a throttle valve included in the engine 67. The transmission controller 62 controls the transmission 65 according to a transmission control signal provided by the vehicle control unit 6. The brake controller 63 controls the brake actuator 66 according to a brake control signal provided by the vehicle control unit 6.

When the vehicle control unit 6 generates the control signals for controlling the throttle valve controller 61, the transmission controller 62 and the brake controller 63, the vehicle control unit 6 is able to program a vehicle control algorithm easily and to reduce decision processes because the merged information about the recognized results provided by the sensors (the image-processing unit 1, the radar unit 2 and the road information acquisition unit 3) is accompanied by information identifying the recognized object.

Figure 4:
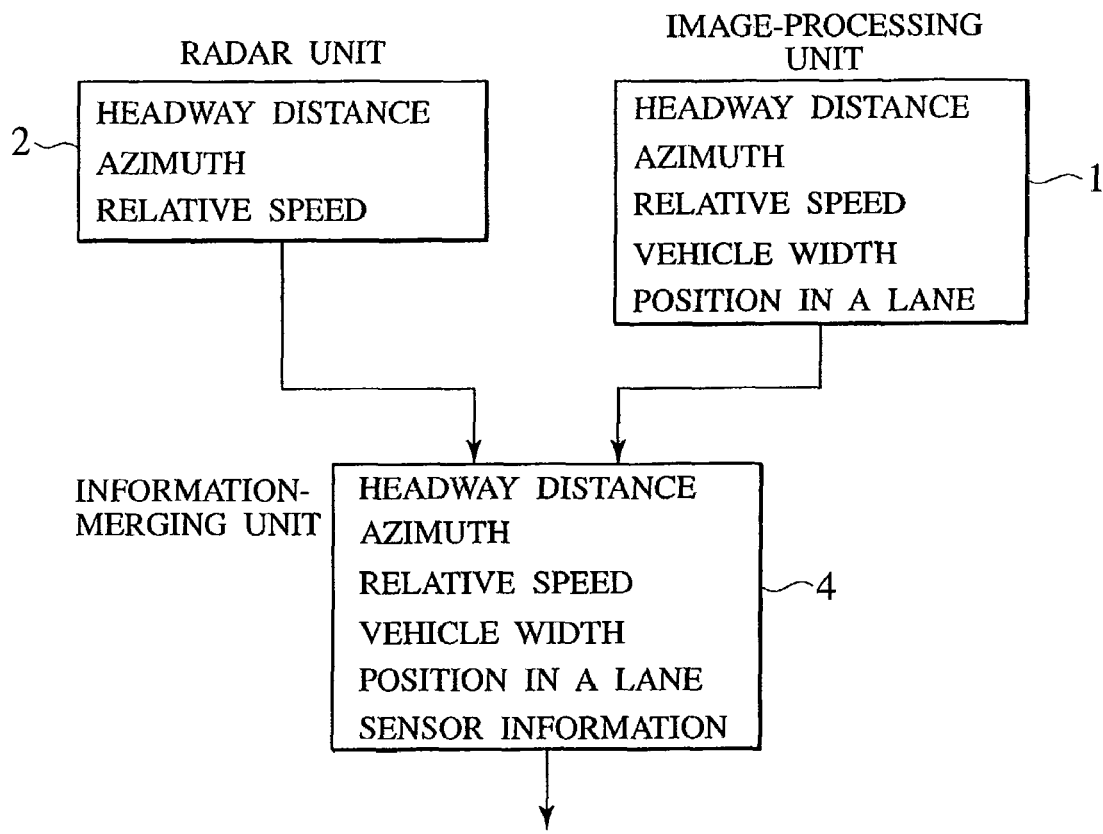
FIG. 4 is a block diagram of assistance in explaining a processing procedure to be executed by an information-merging unit.

An information-merging procedure to be carried out by the information-merging unit 4 will be described with reference to FIG. 4.

A first information merging method makes a query to see if an object of measurement by the radar unit 2 and an object of measurement by the image-processing unit 1 are one and the same vehicle. If the response to the query is affirmative, the vehicle width and a position in a lane measured by the image-processing unit 1 are added to the vehicle interval, the azimuth and the relative speed measured by the image-processing unit 1 and the radar unit 2. Sensor information indicating the use of both the recognition results provided by the image-processing unit 1 and the radar unit 2 may additionally be used as identification information identifying the recognition object.

More concretely, when the information-merging unit 4 merges vehicle interval, azimuth and relative speed measured by the radar unit 2, and vehicle interval, azimuth, relative speed, vehicle width and position in a lane measured by the image-processing unit 1, and when the vehicle intervals, the azimuth and the relative speeds measured by the image-processing unit 1 and the radar unit 2 are identical respectively, i.e., when both the image-processing unit 1 and the radar unit 2 measured information abut one and the same vehicle, information indicating that pieces of the measured information are those for the same vehicle is added to the information including the vehicle interval, the azimuth and the relative speed, and information indicating that the information was measured only by the image-processing unit 1 is added to the pieces of measured information including the vehicle width and the position in a lane.

When the image-processing unit 1 and the radar unit 2 measured information about different vehicles, respectively, information indicating that those pieces of information are those about different vehicles is added to the merged information.

A decision as to whether or not the vehicle with which the radar unit 2 made measurement and the vehicle with which the image-processing unit 1 made measurement are one and the same vehicle can be made on the basis of whether or not the vehicle intervals and the azimuth measured by the image-processing unit 1 and the radar unit 2 are similar and in set ranges, respectively.

Figure 5:
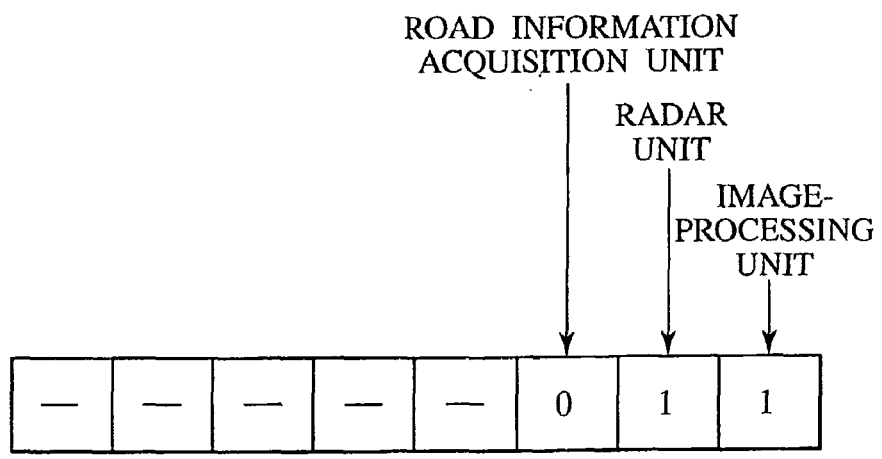
FIG. 5 is a diagram of assistance in explaining a first sensor information adding method.

When the information-merging unit 4 attaches the sensor information to the measured information, bits of 8-bit data are assigned to the image-processing unit 1, the radar unit 2 and the road information acquisition unit 3, respectively, and the bits for the image-processing unit 1 and the radar unit 2 are set to, for example, the 1 state when pieces of the measured information are those about the same vehicle as shown in FIG. 5 or to the 0 state when the same are about different vehicles.

Figure 6:
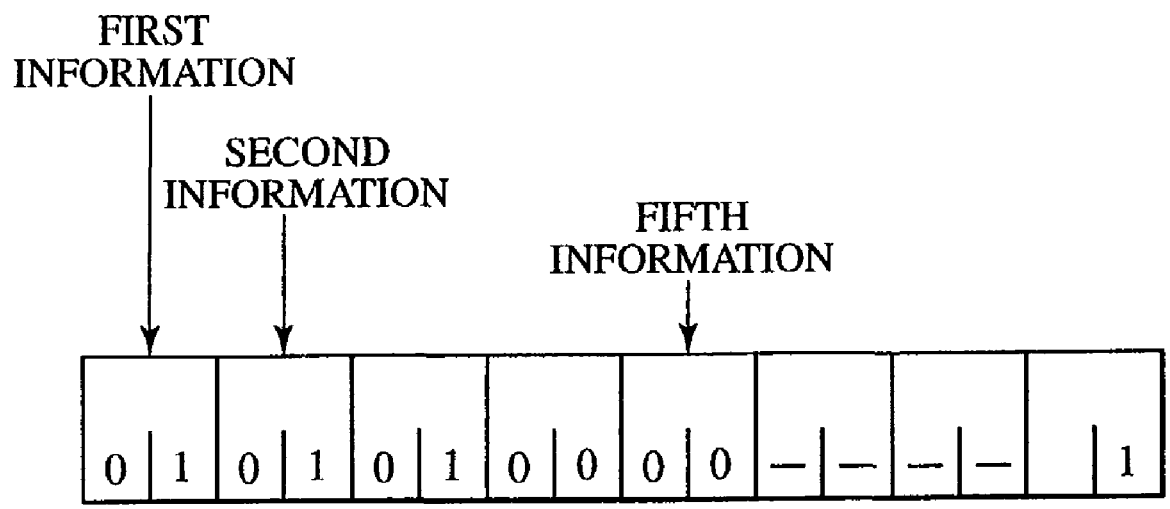
FIG. 6 is a diagram of assistance in explaining a second sensor information adding method.

When the information-merging unit 4 attaches the sensor information to the measured information, two bits are assigned to each of first to seventh pieces of information, where the first piece of information is vehicle interval, the second piece of information is azimuth, the third piece of information is relative speed, the fourth piece of information is vehicle width and the fifth piece of information is position in a lane, one of the two bits for an eighth piece of information is used to indicate sensor information, and the other bit (the last bit) for the eighth piece of information is used to indicate information indicating whether or not the vehicles as objects of recognition are one and the same vehicle. In FIG. 6, the first to the third piece of information are those measured by the radar unit 2, the fourth and the fifth piece of information are those measured by the image-processing unit, and the last bit of the eighth piece of information is set to the 1 state indicating that the vehicles are one and the same vehicle. The first to the third piece of information indicate that pieces of measured information measured by the radar unit 2 and those of measured information measured by the image-processing unit 1 are those about one and the same vehicle; that is the measurements relating to the plurality of measuring objects are those relating to one and the same vehicle. The measured results can be used as sensor information even when only the measured results relating to a single measuring object are the same (measurements relating to one and the same vehicle).

Figure 7:
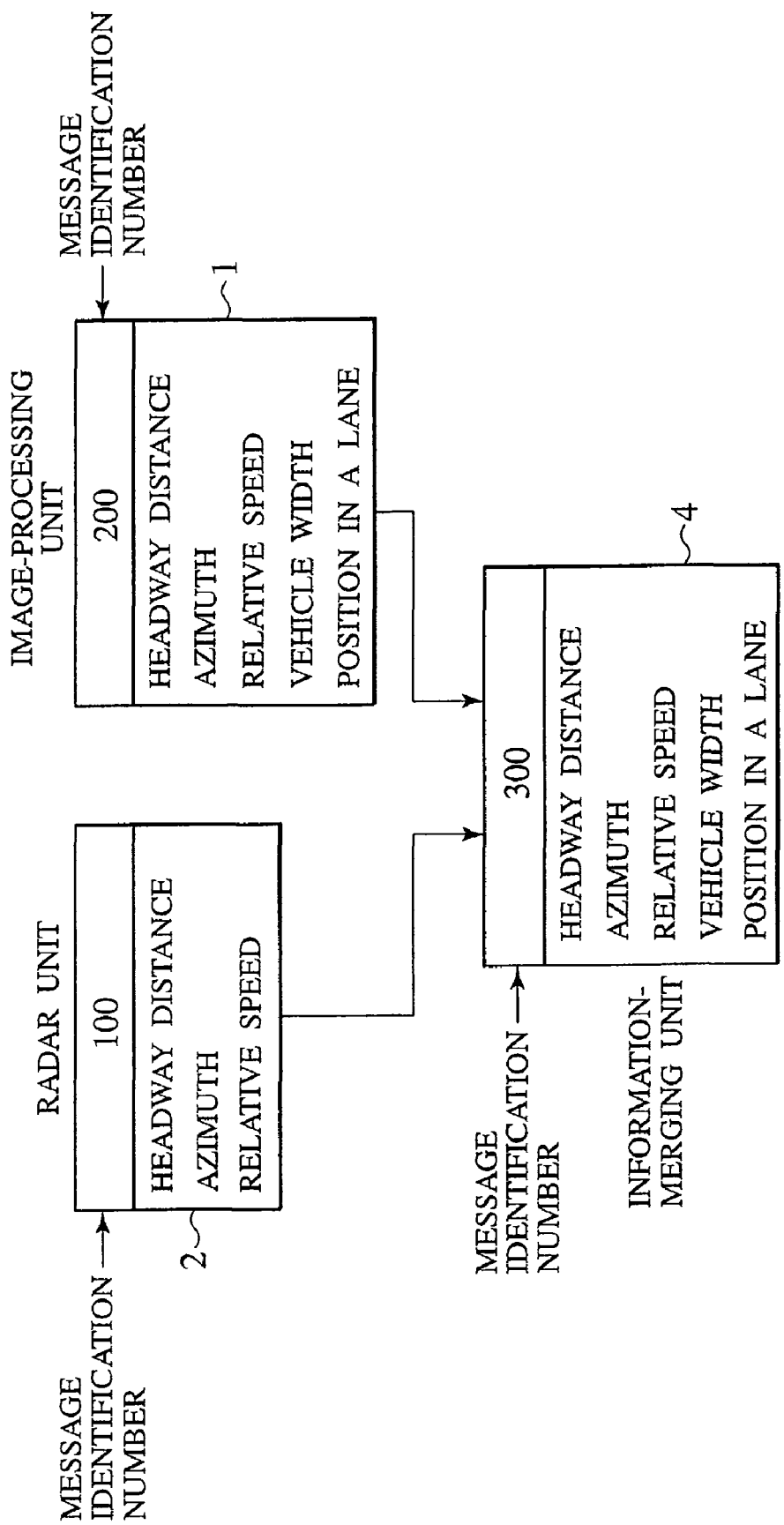
FIG. 7 is a diagram of assistance in explaining a third sensor information adding method.

As shown in FIG. 7, a message identification number "100" assigned to the radar unit 2 may be attached to the measured results provided by the radar unit 2, a message identification number "200" assigned to the image-processing unit 1 may be attached to the measured results provided by the image-processing unit 1, and the information-merging unit 4 may attach a message identification number "300" to the merged information obtained by merging the measured results provided by the image-processing unit 1 and the radar unit 2, when the measured results provided by the image-processing unit 1 and the radar unit 2 are those relating to one and the same vehicle. When the image-processing unit 1 and the radar unit 2 measured information about different vehicles, respectively, a message identification number "400", by way of example, indicating that the measured results provided by the image-processing unit 1 and those provided by the radar unit 2 relate to different vehicles, respectively, is attached to the merged information.

Figure 8:
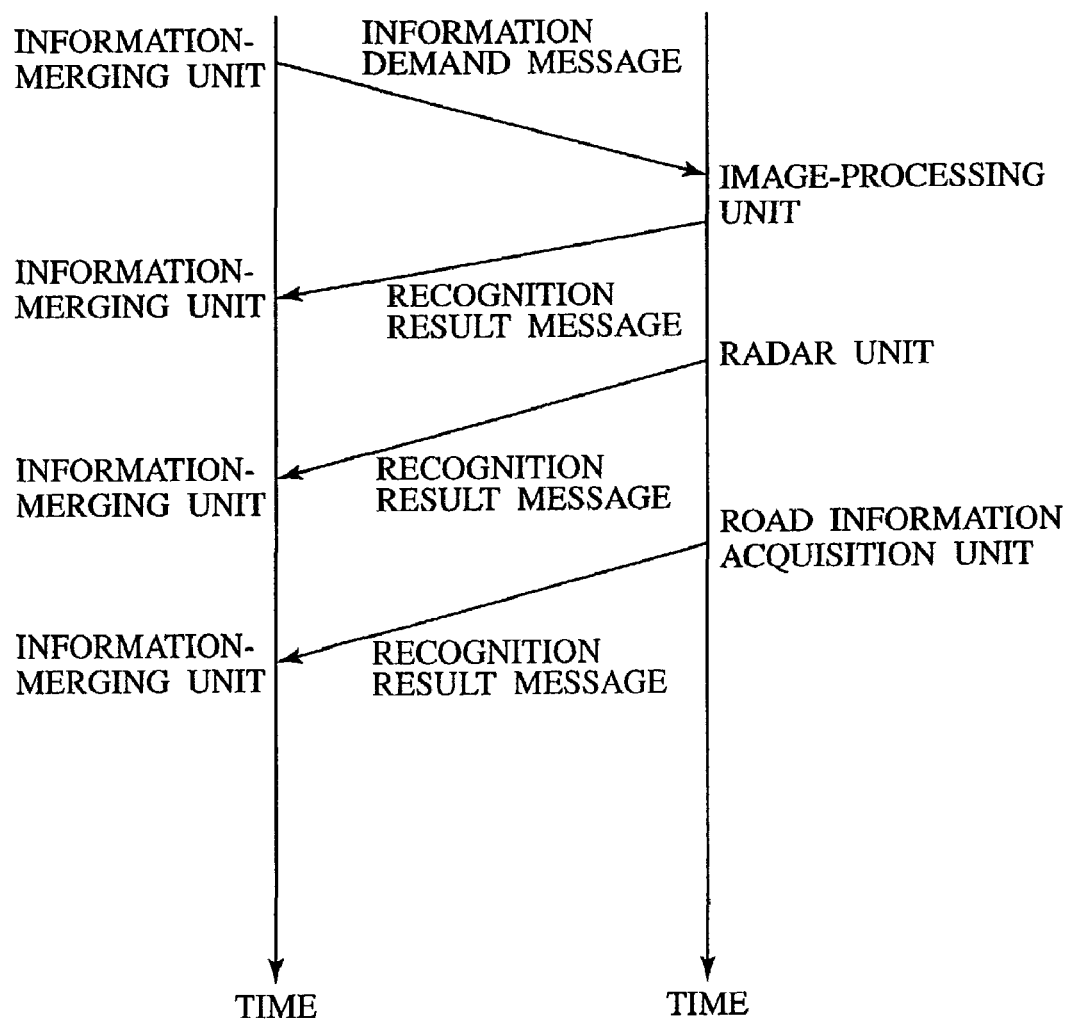
FIG. 8 is a diagram of assistance in explaining a recognition result demand sequence.

A second information merging method may be used. The second information-merging method provides the information-merging unit 4 with an output demanding function to demand measured results from the image-processing unit 1, the radar unit 2 and the road information acquisition unit 3. For example, as shown in FIG. 8, the information-merging unit 4 sends an information demand message through the network 5 to the image-processing unit 1, the radar unit 2 and the road information acquisition unit 3 to demand measured results from those units 1, 2 and 3. Then, the image-processing unit 1, the radar unit 2 and the road information acquisition unit 3 send messages relating to the measured results through the network 5 to the information-merging unit 4 in response to the information demand message. The information-merging unit 4 receives the measured results, executes the information merging operation shown in FIG. 4 to produce the merged information, and provides the merged information provided with the sensor information.

Figure 9:
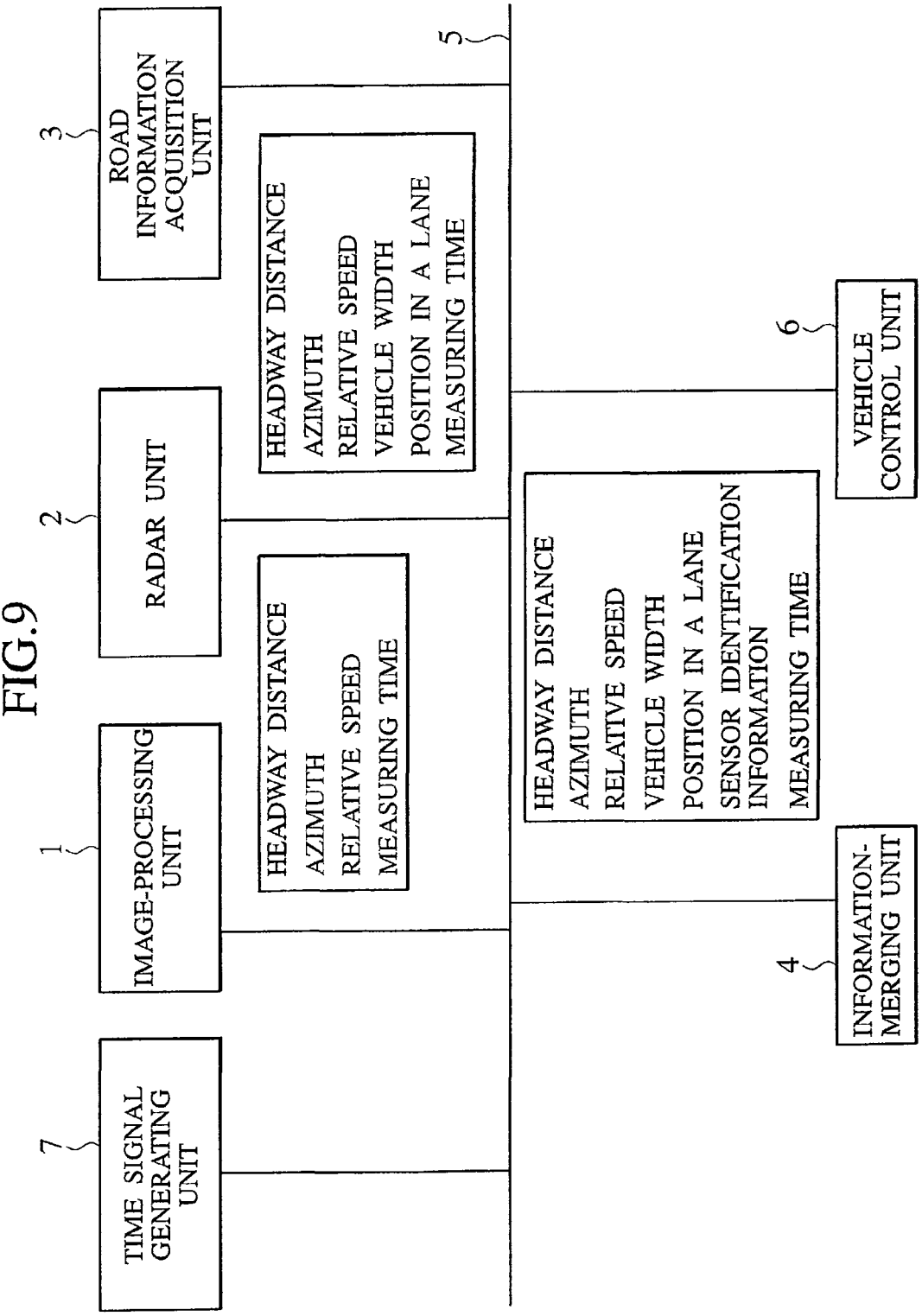
FIG. 9 is a block diagram of a traffic environment recognition system in a second embodiment according to the present invention.

A traffic environment recognition system in a second embodiment according to the present invention will be described with reference to FIG. 9. The traffic environment recognition system in the second embodiment executes a third information merging method. The traffic environment recognition system is the same in constitution as the traffic environment recognition system in the first embodiment, except that the traffic environment recognition system in the second embodiment is provided with a time signal generating unit 7 in addition to an image-processing unit 1, a radar unit 2 and a road information acquisition unit 3. The time signal generating unit 7 provides time signals, i.e., a synchronizing signal, sequentially on a network 5 to synchronize the operations of the image-processing unit 1, the radar unit 2 and the road information acquisition unit 3.

Times needed for the image-processing unit 1, the radar unit 2 and the road information acquisition unit 3 to carry out signal processing operations are dependent on the situation and traveling mode of the host vehicle, and hence operations of the image-processing unit 1, the radar unit 2 and the road information acquisition unit 3 need to be synchronized. For example, the complexity of images varies with the variation of the traffic situation, and hence time necessary for the image-processing unit 1 to recognize the preceding vehicle by processing an image is dependent on the traffic situation. Consequently, the sequence of time when the radar 2 performed measurement, time when the image-processing unit 1 forms an image, and time when processed information provided by the radar unit 2 and the image-processing unit 1 is given to the vehicle control unit 6 is dependent on the traffic situation and, sometimes, such a time error causes an error in the control operation of the vehicle control unit 6.

In the traffic environment recognition system in the second embodiment, the time signal generating unit 7 provides time signals sequentially on the network 5, the image-processing unit 1 stores image input time when the image-processing unit 1 forms an image, the radar unit 2 stores measurement starting time when measurement is started, and the road information acquisition unit 3 stores position calculating time when the calculation of the position of the host vehicle using GPS is started. When recognition results provided by the image-processing unit 1, the radar unit 2 and the road information acquisition unit 3 are sent out, the image input time and the measurement starting time are added to the recognition results.

Referring to FIG. 1, the image-processing unit 1 forms an image of the environment of the host vehicle, and stores image information together with image input time $t(n)$ when the image is captured. Subsequently, the image-processing unit 1 carries out an object recognizing process to recognize a desired object in the image, and sends a recognition result and the image input time $t(n)$ through the network 5 to the information-merging unit 4 after the completion of the object recognizing process.

The radar unit 2 emits an electric wave or a light beam in synchronism with the time signal to start measurement at time $t(n+m)$, stores the time $t(n+m)$, processes radar signals, and gives measured results together with the measurement starting time $t(n+m)$ to the information-merging unit 4.

Figure 10:
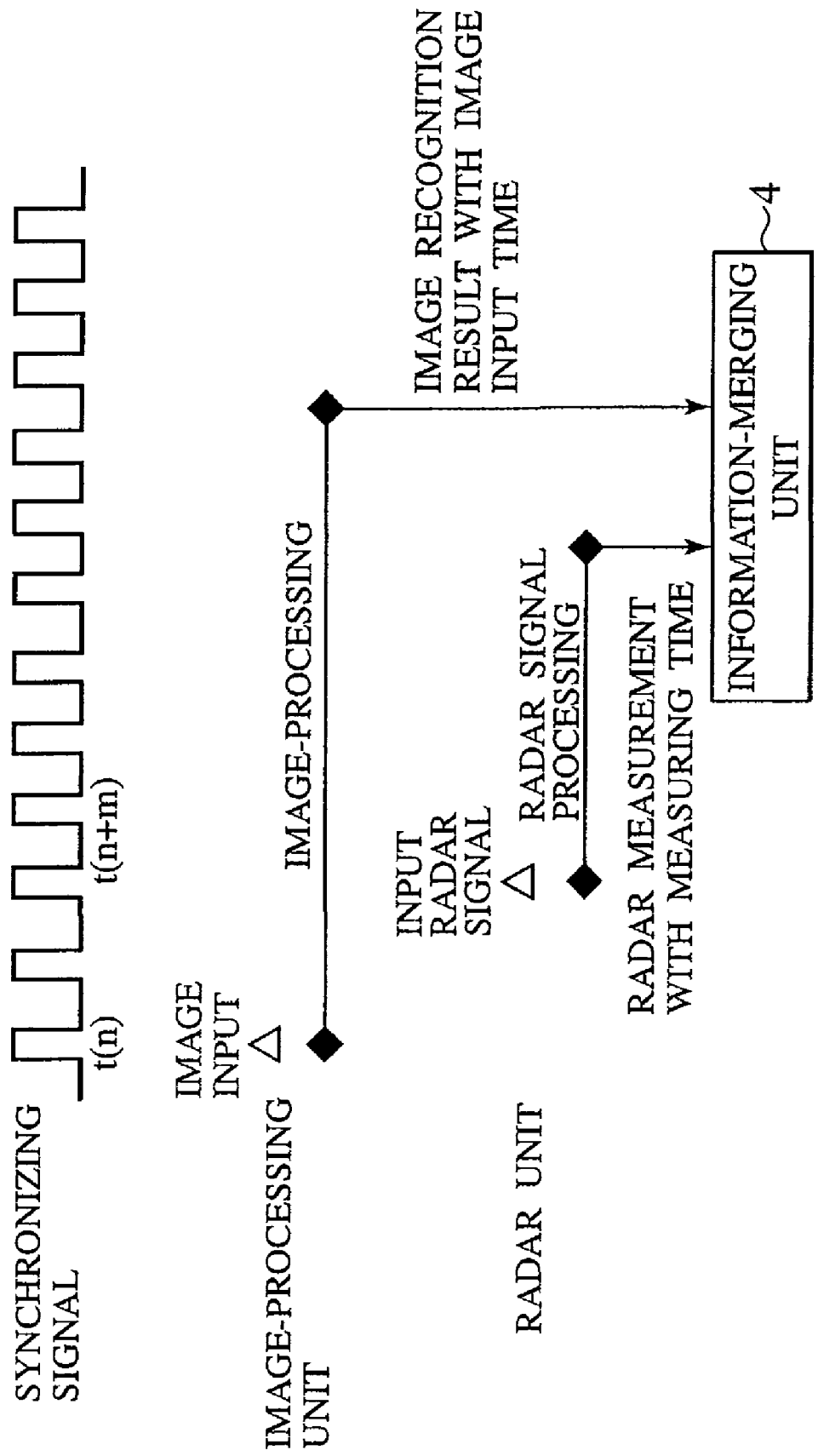
FIG. 10 is a time chart of assistance in explaining the functions of the traffic environment recognition system shown in FIG. 9.

Referring to FIG. 10, the image-processing unit 1 forms an image at image input time $t(n)$ earlier than the measurement starting time $t(n+m)$ when the radar unit 2 starts measurement. Since a time necessary for the image-processing unit 1 to process an image is different from a time necessary for the radar unit 2 to process signals, sometimes time when the image-processing unit 1 sends recognition results to the information-merging unit 4 is later than time when the radar unit 2 sends recognition results to the information-merging unit 4. If the information-merging unit 4 processes those recognition results as they are, it is possible that those recognition results are decided mistakenly to be those relating to different vehicles, even if those recognition results relates to a single vehicle.

The information-merging unit 4 compares the time $t(n)$ attached to the recognition results provided by the image-processing unit 1, and the time $t(n+m)$ attached to the recognition results provided by the radar unit 2, rearranges the recognition results according to the result of comparison of the times $t(n)$ and $t(n+m)$, carries out a merging operation for merging the recognition results provided by the image-processing unit 1 and those provided by the radar unit 2, and decides the identity of the recognition object relating to the recognition results.

Figure 11:
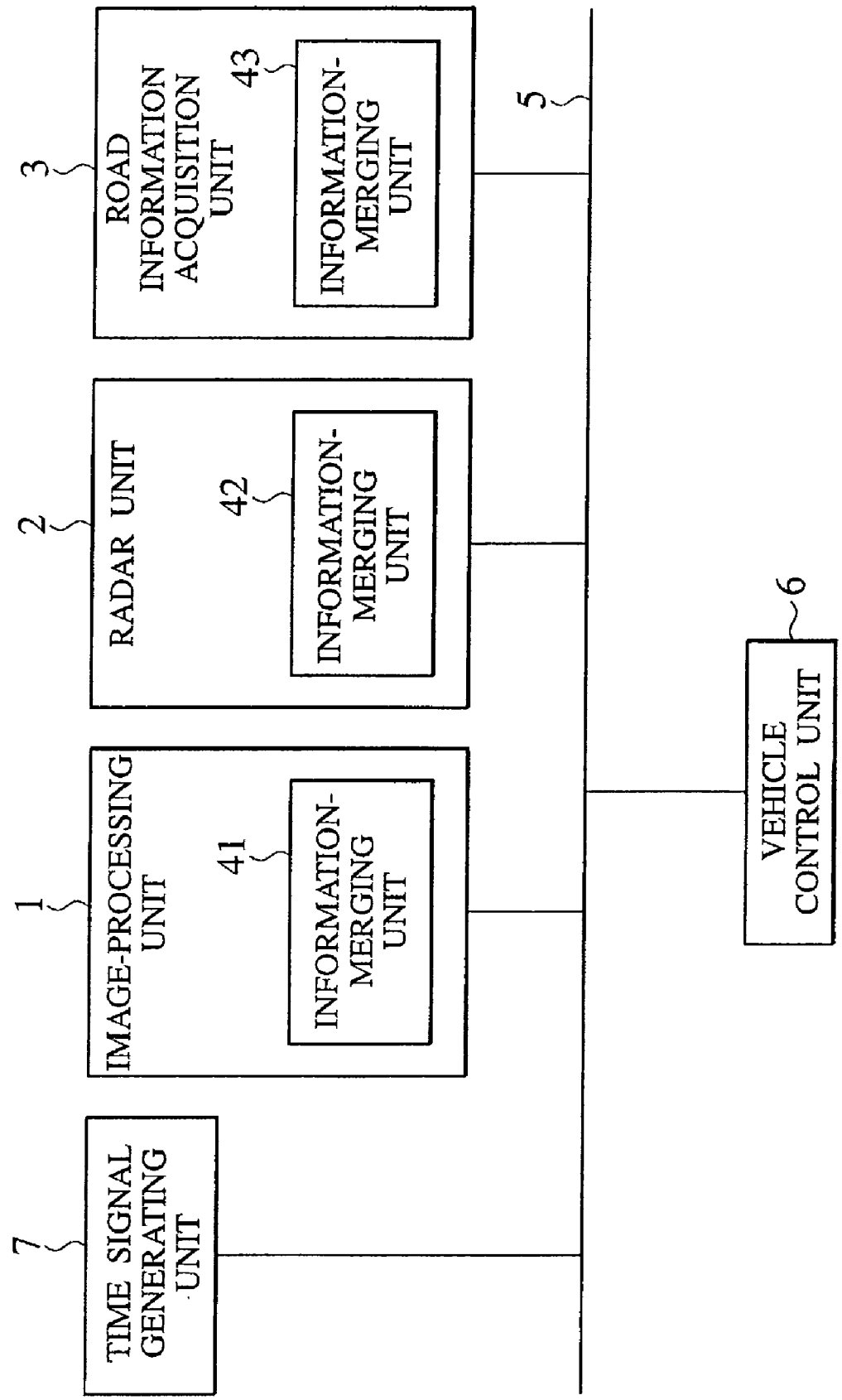
FIG. 11 is a block diagram of a traffic environment recognition system in a third embodiment according to the present invention.

The information merging process can be carried out on an assumption that one and the same vehicle was recognized by both the image-processing unit 1 and the radar unit 2 if the times $t(n)$ and $t(n+m)$ are in a predetermined time interval range of, for example, 0.05 to 0.10 s, or can be carried out on an assumption that different vehicles were recognized by the image-processing unit 1 and the radar unit 2 if the interval between the times $t(n)$ and $t(n+m)$ is longer than the upper limit of the foregoing predetermined time interval range. It is also possible to decide whether the image-processing unit 1 and the radar unit 2 recognized one and the same vehicle or whether the same recognized different vehicles, respectively, on the basis of the result of examination of the recognition results and the times $t(n)$ and $t(n+m)$, Referring to FIG. 11, a traffic environment recognition system in a third embodiment includes an image-processing unit 1 provided with an information-merging unit 41, a radar unit 2 provided with an information-merging unit 42, a road information acquisition unit 3 provided with an information-merging unit 43, and a time signal generating unit 7. The information-merging units 41, 42 and 43 are the same in function as the foregoing information-merging unit 4. The traffic environment recognition system in the third embodiment is the same in other respects as the traffic environment recognition system in the second embodiment shown in FIG. 9.

Since the information-merging units 41, 42 and 43 are internal devices, and the traffic environment recognition system does not need any external information-merging unit, the traffic environment recognition system can be manufactured at a reduced cost.

A traffic environment recognition system in a fourth embodiment according to the present invention will be described with reference to FIG. 12. This traffic environment recognition system is provided with an information-merging unit 69 having the same function as the information-merging unit 4 and included in a vehicle control unit 6 provided with a vehicle control arithmetic unit 68 instead of an information-merging unit connected to a network 5. The traffic environment recognition system in the fourth embodiment is the same in other respects as that in the second embodiment shown in FIG. 9.

Although the traffic environment recognition systems in the foregoing embodiments use different means for recognizing the environment of the host vehicle as traffic environment recognizing means, the same may use identical traffic environment recognizing means. For example, a plurality of image-processing units similar to the foregoing image-processing unit 1 may be disposed on different parts of the host vehicle, recognition results provided by the plurality of image-processing units may be merged to provided merged information, and the merged information may be provided together with identification information identifying the recognition object.

When a vehicle is provided with both the traffic environment recognition system and the vehicle control unit in each of the foregoing embodiments, a vehicle control algorithm for the vehicle control unit can be easily programmed, functions and reliability of vehicle control operations can be improved, safety can be improved, and the automatic operation of a vehicle is realizable.

As apparent from the foregoing description, according to the present invention, recognition results provided by at least two traffic environment recognizing means are merged to produce merged information, and the merged information is provided together with identification information identifying a recognition object relating to the recognition results. Thus, highly reliable traffic environment recognition information can be provided.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An environment recognition system comprising;
   a plurality of host vehicle environment recognizing units operatively connected to a network;
   distinguishing units for distinguishing results recognized by each of the plurality of environment recognizing units, and
   information merging units for the recognized results distinguished by the distinguishing units, wherein
   the merging unit adds a time information and a position information of at least one recognized object out of the plurality of recognized objects to the merged information.

2. The environment recognition system according to claim 1, further comprising:
   a time signal generating unit for outputting a common time information of each of the plurality of environment recognizing unit to the network.

3. The environment recognition system according to claim 2, wherein the time information includes a measurement time.

4. The environment recognition system according to claim 3, wherein
   the information merging unit is configured to judge that a first object recognized by a the first of the environment recognizing units and a second object recognized by a the second of the environment recognizing units are the same when a time measured by the first environment recognizing unit and a time measured by the second environment recognizing unit are in a predetermined time.

5. The environment recognition system according to claim 3, wherein
   the information merging unit is configured to judge that a first object recognized by a first of the environment recognizing units and a second object recognized by a second of the environment recognizing units are different when a time measured by the first environment recognizing unit and a time measured by the second environment recognizing unit are not in a predetermined time.

6. An environment recognition method in a system having a plurality of host-vehicle environment recognizing units operatively connected to a network comprising;
   distinguishing each result recognized by each of the plurality of host-vehicle environment recognizing units, and
   information from merging each of the results recognized and distinguished including adding time information and position information of at least one recognized object out of the plurality of recognized objects to the merged information.

7. The environment recognition method according to claim 6, further comprising generating a time signal for outputting common time information of each of the plurality of environment recognizing unit to the network.

8. The environment recognition method according to claim 7, wherein the time information includes measurement time.

9. The environment recognition method according to claim 8, wherein the information merging includes judging that a first recognized object of the first environment recognizing unit and a second recognized object of the second environment recognizing unit are the same when a time measured by a first environment recognizing unit and a time measured by a second environment recognizing unit are in a predetermined time.

10. The environment recognition method according to claim 8, wherein the information merging includes judging that a first recognized object of the first environment recognizing unit and a second recognized object of the second environment recognizing unit recognized are different when a time measured by a first environment recognizing unit and a time measured by a second environment recognizing unit are not in a predetermined time.

* * * * *